(12) United States Patent
Zimmermann et al.

(10) Patent No.: US 10,795,136 B2
(45) Date of Patent: Oct. 6, 2020

(54) WAFER LEVEL LENS STACK, OPTICAL SYSTEM, ELECTRONIC DEVICE AND METHOD

(71) Applicant: Sony Corporation, Tokyo (JP)

(72) Inventors: Klaus Zimmermann, Neckartecnzlingen (DE); Alexander Gatto, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 777 days.

(21) Appl. No.: 15/447,510

(22) Filed: Mar. 2, 2017

(65) Prior Publication Data
US 2017/0269341 A1 Sep. 21, 2017

(30) Foreign Application Priority Data

Mar. 17, 2016 (EP) .................................... 16161011

(51) Int. Cl.
*G02B 13/00* (2006.01)
*G02B 27/64* (2006.01)
*G02B 3/14* (2006.01)
*G02B 7/04* (2006.01)
*G02B 26/08* (2006.01)

(52) U.S. Cl.
CPC ........... *G02B 13/0085* (2013.01); *G02B 3/14* (2013.01); *G02B 7/04* (2013.01); *G02B 13/009* (2013.01); *G02B 26/0875* (2013.01); *G02B 27/646* (2013.01)

(58) Field of Classification Search
CPC .............. G02B 26/0875; G02B 27/646; G02B 13/0085; G02B 13/009; G02B 3/12; G02B 3/14

USPC ......................................... 359/666, 665, 291
See application file for complete search history.

(56) References Cited

U.S. PATENT DOCUMENTS

| 5,665,275 | A | * | 9/1997 | Kobayashi | ............... G02B 1/04 252/582 |
| 6,882,482 | B2 | * | 4/2005 | Ogasawara | ......... G02F 1/13471 359/565 |
| 7,796,349 | B2 | | 9/2010 | Deng et al. | |
| 9,049,367 | B2 | | 6/2015 | Venkataraman et al. | |
| 2004/0108984 | A1 | * | 6/2004 | Ogasawara | ........ G11B 7/13927 345/87 |
| 2007/0263293 | A1 | * | 11/2007 | Batchko | ................... F03G 7/005 359/666 |
| 2009/0015706 | A1 | | 1/2009 | Singh | |
| 2009/0180198 | A1 | * | 7/2009 | Lee | .......................... G02B 3/14 359/666 |
| 2010/0195213 | A1 | * | 8/2010 | Bolis | .................... G02B 26/004 359/666 |
| 2011/0019169 | A1 | * | 1/2011 | Conradi | ................... G02B 3/14 355/30 |

(Continued)

FOREIGN PATENT DOCUMENTS

CN 101718900 6/2011

*Primary Examiner* — William R Alexander
(74) *Attorney, Agent, or Firm* — Xsensus LLP

(57) ABSTRACT

The present disclosure pertains to a wafer level lens stack, which has a substrate, a first, a second lens and an actuator. The substrate has a first side and a second side. The second side is opposite to the first side. The first lens is on the first side of the substrate. The second lens is on the second side of the substrate and the second lens can change its refraction characteristic. The actuator can change the refraction characteristic of the second lens.

20 Claims, 3 Drawing Sheets

(56) References Cited

U.S. PATENT DOCUMENTS

| | | | |
|---|---|---|---|
| 2011/0085094 A1* | 4/2011 | Kao | G02B 30/27 |
| | | | 349/5 |
| 2011/0141341 A1* | 6/2011 | Lin | G02F 1/29 |
| | | | 348/345 |
| 2012/0081801 A1 | 4/2012 | Duparre et al. | |
| 2012/0092775 A1* | 4/2012 | Duston | G02B 3/14 |
| | | | 359/666 |
| 2012/0147478 A1* | 6/2012 | Lee | G02B 3/14 |
| | | | 359/666 |
| 2012/0248195 A1* | 10/2012 | Feng | G02B 3/14 |
| | | | 235/472.01 |
| 2014/0347748 A1 | 11/2014 | Duparre | |
| 2016/0349506 A1* | 12/2016 | Meneghini | G02B 3/12 |

\* cited by examiner

WAFER LEVEL LENS STACK, OPTICAL SYSTEM, ELECTRONIC DEVICE AND METHOD

TECHNICAL FIELD

The present disclosure generally pertains to a wafer level optics, and, in particular, to a wafer level lens stack, an optical system and electronic device with a wafer level lens stack and a method of manufacturing of a wafer level lens stack.

TECHNICAL BACKGROUND

Current smartphones and other electronic devices, such as pocket cameras, typically include a digital camera having an image sensor and an optical element for focusing light rays onto the image sensor.

There exist several known technologies for producing such optical elements. One technology is the so-called wafer level lens technology, where lenses are produced directly on a wafer, i.e. on the wafer level. With that technology small lenses can be produced having a diameter in the order of some millimeters or even less than 1 mm.

Another technology is the so-called MEMS-technology, i.e. microelectromechanical systems technology. With that technology, small tunable lenses can be produced, which may have a diameter in the order of some millimeters or even less than 1 mm.

Although there exist techniques for providing small lenses, there exists a need for improving the known technology.

SUMMARY

According to a first aspect, the disclosure provides a wafer level lens stack, including a substrate having a first side and a second side, the second side being opposite to the first side; a first lens on the first side of the substrate; a second lens on the second side of the substrate, wherein the second lens is capable of changing its refraction characteristic; and an actuator adapted to change the refraction characteristic of the second lens.

According to a second aspect, the disclosure provides an optical system, including a wafer level lens stack, including a substrate having a first side and a second side, the second side being opposite to the first side; a first lens on the first side of the substrate; a second lens on the second side of the substrate, wherein the second lens is capable of changing its refraction characteristic; and an actuator adapted to change the refraction characteristic of the second lens, the optical system further including an image sensor.

According to a third aspect, the disclosure provides an electronic device, including a wafer level lens stack, including a substrate having a first side and a second side, the second side being opposite to the first side; a first lens on the first side of the substrate; a second lens on the second side of the substrate, wherein the second lens is capable of changing its refraction characteristic; and an actuator adapted to change the refraction characteristic of the second lens, the electronic device further including an image sensor, and a controller configured to control the actuator and the image sensor.

According to a fourth aspect, the disclosure provides a method of manufacturing a wafer level lens stack, including providing a substrate having a first side and a second side; providing a first lens on the first side of the substrate; providing a second lens on the second side of the substrate, wherein the second lens is capable of changing its refraction characteristic; and providing an actuator adapted to change the refraction characteristic of the second lens.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
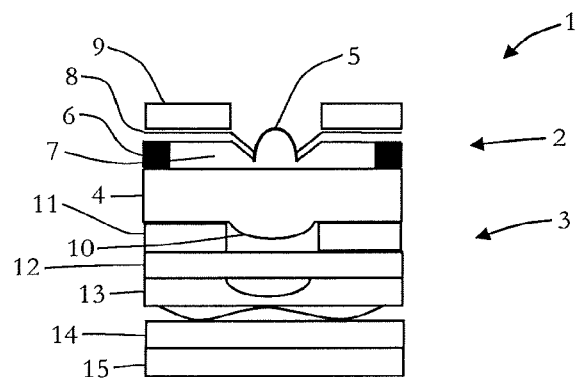
FIG. 1 illustrates a first embodiment of a wafer level lens stack.

Before describing the embodiments under reference of FIG. 1 in detail, general explanations are made.

Some embodiments pertain to a wafer level lens stack, including a substrate having a first side and a second side, the second side being opposite to the first side. As discussed in the outset, a wafer level lens is a lens which is (directly) produced on a wafer. The wafer level lens stack further includes a first lens on the first side of the substrate, a second lens on the second side of the substrate, wherein the second lens is capable of changing its refraction characteristic, and an actuator adapted to change the refraction characteristic of the second lens.

Hence, in some embodiments on one side of the substrate, the first lens is formed, for example, in accordance with the, in principle, known wafer level optic technology. In this technology, for example, a polymer film is formed on the substrate. The polymer film is formed with a mold for forming a lens shape. Then, the polymer film is cured by applying ultraviolet light, as it is generally known to the skilled person. Thereby, the first lens can be produced on the first side of the substrate. In some embodiment, also the substrate itself can have the first lens integrally formed on the first side. Hence, the first lens may be directly located on the first side.

The second lens is capable of changing its refraction characteristic, and, thus, tunable. The second lens can be made of any type of elastic material, such as a polymer, but it can also be a liquid lens, or similar, which includes a liquid or liquid crystal which can change its refraction characteristic by changing its shape or it internal orientation of molecules or the like. In some embodiments, the second lens may even be made of a glass material which can be deformed.

The second lens may be directly located on the second side. In some embodiment, the second lens may also be indirectly located on the second side and, for example, one or more spacers, the actuator or parts of the actuator may be sandwiched between the second side and a side of the lens. In such embodiments, the second lens is the only optical part, e.g. the only lens, between the second lens itself and the second side of the substrate, i.e. there is no further lens element between the second lens and the second side of the substrate, and, thus, there is no lens element between the first lens and the second lens.

The actuator can be adapted to the material or construction of the lens, in order to give the lens a predefined shape by deforming the second lens. Thus, the actuator may be adapted to exert a mechanical force on the second lens. By amending the shape of the lens, i.e. by "tuning" the lens, the focal point of the lens can be amended in a predefined manner due to the resulting change of its refraction characteristic. The actuator may include one or more piezoelectric elements. The actuator may directly deform the shape of the lens by, for example, directly exerting a force on the lens itself, or it may indirectly deform the shape of the lens by e.g. exerting a force on a member, such as a membrane or the like, which is attached to the lens. Hence, by exerting the force on the member, the exerted force is transferred to the second lens, thereby deforming the second lens.

The actuator may also be adapted to apply electric energy, or similar, to the liquid lens, for example, in order to influence an internal orientation of molecules of a liquid crystal material of the liquid lens, thereby changing the refraction characteristic of the second lens.

In other words, in some embodiments, the wafer level lens stack has a tunable lens part including the second lens and a wafer level lens part including the first lens, wherein the tunable lens part and the wafer level lens part share the common substrate by having located the first lens on one side of the substrate and having located the second lens on the other side of the substrate, wherein the first side is opposite to the second side.

In some embodiments, the total track length and the production costs can be reduced compared to the existing technology, since the substrate is shared by the tunable lens part and the wafer level lens part.

The substrate may be a glass substrate.

The actuator may be based on the microelectromechanical systems technology. The wafer level lens stack may further include an optical membrane attached to the second lens, wherein the actuator is adapted to exert a force on the membrane, thereby deforming the shape of the second lens and thereby changing its refraction characteristic. It is also known to produce microelectromechanical systems on a wafer. In other embodiments, the optical membrane itself may include one or more actuators, such as piezoelectric elements.

In some embodiments, the second lens is a liquid lens and the actuator is adapted to apply electric energy to the liquid lens for deforming the liquid lens in order to change the refraction characteristic of the liquid lens. Liquid lenses may be based on the electrowetting phenomenon, wherein, for a specific liquid, the wettability of a surface depends on the applied voltage. In such embodiments the liquid lens, i.e. the second lens, may be directly located on the second surface of the substrate.

In some embodiments, the second lens is a liquid crystal lens. A liquid crystal lens typically includes a liquid crystal material which has different diffractive characteristics depending on an applied voltage. Accordingly, the actuator may be adapted to apply electric energy to the liquid lens for changing the refraction characteristic of the liquid crystal lens. The change of the refraction characteristic is based, for example, on different orientations of the liquid crystal molecules, since the orientation of the liquid crystal molecules may depend on an applied voltage level.

In some embodiments, the wafer level lens stack further includes a third lens being capable of changing its refraction characteristic and further includes a second actuator adapted to change the refraction characteristic of the third lens. The third lens may be configured as any one of the examples given above for the second lens. By providing two lenses which are capable of changing their refraction characteristic together with associated actuators, a zooming functionality can be provided by controlling the actuators of the two lenses, i.e. the second and third lens, accordingly.

In the above description, it is assumed that only a first, second, and optionally a third lens is provided. However, the present disclosure is not limited in that regard and the wafer level lens stack may include multiple lenses. Moreover, the second lens may be located at any position within the wafer level lens stack.

Some embodiments pertain to an optical system, including a wafer level lens stack, including a substrate having a first side and a second side, the second side being opposite to the first side; a first lens on the first side of the substrate; a second lens on the second side of the substrate, wherein the second lens is capable of changing its refraction characteristic; and an actuator adapted to change the refraction characteristic of the second lens, as has been described above in detail for the wafer level lens stack. All features of the wafer level lens stack described herein may be implemented in the optical system. The optical system further includes an image sensor, e.g. a CMOS sensor, CCD sensor, or the like, such that the optical system can be used as a digital camera module in a mobile device, smart phone, tablet pc, digital camera, wearable device (e.g. glasses, wristlet), etc.

The image sensor may include an image surface and the second lens may be located adjacent to the image surface of the image sensor. In some embodiments, there is no further optical element, i.e. no further lens, between the image surface of the image sensor and the second lens. In such embodiments, the so-called back focal length, which describes the distance between the final lens surface and the image sensor, can be adapted. This is useful, for example, for autofocus implementations of the optical system, wherein a measured blur is compensated by adapting the back focal length accordingly. Hence, in some embodiments, the optical system further includes a controller for controlling the actuator, thereby controlling a distance between the second lens and the image surface of the image sensor, in order to adjust the back focal length.

In some embodiments, the optical system further includes a controller for controlling the actuator, and a movement detector for detecting a movement of the optical system. The controller is adapted to compensate a detected movement of the optical system by controlling the actuator such that the refraction characteristic of the second lens is such changed that the detected movement is compensated. The controller may include a microprocessor and a memory.

Some embodiments pertain to an electronic device, e.g. a mobile device, smart phone, tablet pc, digital camera, wearable device (e.g. glasses, wristlet), etc. The electronic device includes a wafer level lens stack as described herein, i.e. including a substrate having a first side and a second side, the second side being opposite to the first side; a first lens on the first side of the substrate; a second lens on the second side of the substrate, wherein the second lens is capable of changing its refraction characteristic; and an actuator adapted to change the refraction characteristic of the second lens. The electronic device further includes an image sensor, e.g. a CMOS sensor, CCD sensor, or the like, and a controller for controlling the actuator and the image sensor. As mentioned, the controller may comprise a microprocessor and a memory.

In some embodiments, as discussed herein with respect to the optical system, the image sensor includes an image surface and the second lens is located adjacent to the image surface of the image sensor. The controller may be adapted to control a distance between the second lens and the image surface of the image sensor by controlling the actuator accordingly. Thereby, a back focal length can be adjusted, as discussed above. In some embodiments, the controller receives respective blur data or it is adapted to determine a blur on the basis of image data captured by the image sensor. Thus, the controller may be adapted to adjust the distance on the basis of the determined blur.

In some embodiments, the electronic device further comprises a movement detector for detecting a movement of the electronic device. The controller is adapted to compensate a detected movement of the electronic device by controlling the actuator such that the refractive characteristic of the second lens is such changed that the detected movement is compensated. In such embodiments, for example, the shape of the second lens is such deformable that it is able to bend or deviate a light beam in a predefined direction, whereby movements of the electronic device may be compensated.

Returning to FIG. 1, there is shown an embodiment of a wafer level lens stack 1.

The wafer level lens stack 1 has a tunable lens part 2, which is based on the so-called microelectromechanical systems technology, and a wafer level lens part 3, which share a common glass substrate 4.

The tunable lens part 2 has a deformable lens 5, made of an elastic polymer material. The deformable lens has a circular shape and it is mounted via a spacer ring 6 on a surface of the glass substrate 4.

An optical oil 7 is filled in the cavity underneath the deformable lens 5 and between the lower surface of the deformable lens 5 and the upper surface of the glass substrate 4.

On the upper side of the deformable lens 5, a membrane 8 is provided (mounted) which has also a circular shape and an opening in its center region such that light can go through it, and, thus, through the wafer level lens stack 1. The membrane 8 has a plurality of piezoelectric elements surrounding the opening (not visible in FIG. 1).

A ring shaped electrode 9 is provided on the upper surface of the membrane 8 in order to supply the membrane 8, i.e. the piezoelectric elements, with electric energy. By applying electric energy to the membrane 8, the membrane 8, i.e. the piezoelectric elements exert a force on the deformable lens 5 such that the shape of the deformable lens 5 is deformed in a predefined manner, whereby its refractive characteristic is changed.

On the lower side of the substrate 4, a lens 10 is formed, as it is known in the wafer level optics. The lens 10 is formed by providing a polymer on the substrate 4, forming it with a mold and curing it by applying ultraviolet light, for example.

Without limiting the scope of the present disclosure, the wafer level lens stack 1 (or in the present embodiment the wafer level lens part 3) has further components after the lens 10 on the substrate 4. There is provided, in the following order, an aperture 11, a substrate 12 with a further lens 13 attached on its surface, a filter element 14 for filtering infrared irradiation, and a final lens 15, which are usual components in a wafer level lens.

Figure 2:
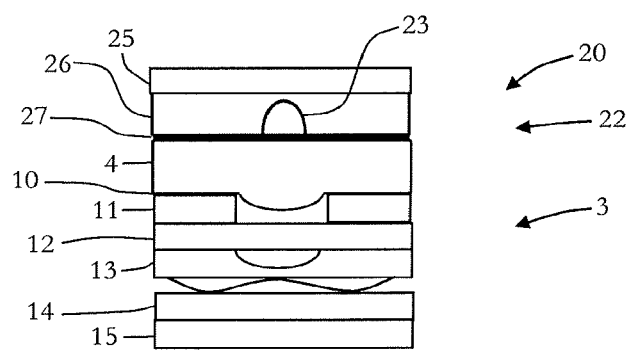
FIG. 2 illustrates a second embodiment of a wafer level lens stack.

FIG. 2 illustrates another embodiments of a wafer level lens stack 20, which has the same wafer level lens part 3 as the wafer level lens stack 1 of FIG. 1, and thus, the substrate 4, the lens 10 and the components 11 to 15 correspond to those of the wafer level lens stack 1 of FIG. 1 and, therefore, it is referred to the above description in that regard.

The wafer level lens stack 20 has a tunable lens part 22 which has a liquid lens 23. The liquid lens 23 is, for example, made of oil which is embedded in an electrolyte fluid 26. On top of the electrolyte fluid 26, an electrode 25 is provided. The liquid lens 23 is located on a further electrode layer 25, which may have, for example, different electrode segments or the like. By applying a voltage on the liquid lens 23 via the electrode 25 and the electrode 27, the wetting of the oil of the liquid lens 23 can be changed, and, thereby, the shape of the liquid lens 23 can be deformed in a predefined manner, whereby its refractive characteristic is changed.

Figure 3:
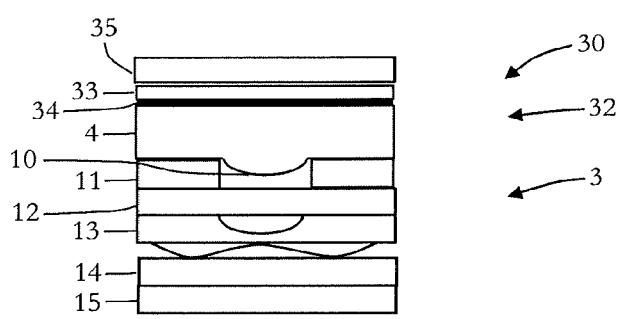
FIG. 3 illustrates a third embodiment of a wafer level lens stack.

A further embodiment of a wafer level lens stack 30 is illustrated in FIG. 3, which has the same wafer level lens part 3 as the wafer level lens stack 1 of FIG. 1, and thus, the substrate 4, the lens 10 and the components 11 to 15 correspond to those of the wafer level lens stack 1 of FIG. 1 and, therefore, it is referred to the above description in that regard.

The wafer level lens stack 20 has a tunable lens part 32 which has a liquid crystal lens 33. The liquid crystal lens 33 is sandwiched between an electrode layer 34 on the lower side and a glass substrate 35 on the upper side. The liquid crystal lens 33 has a liquid crystal material with a plurality of molecules. The orientation of the molecules can be changed by applying a respective voltage on the liquid crystal lens 33 via the electrode layer 34, thereby changing the refractive characteristic of the liquid crystal lens 33. Hence, in this embodiment, the outer shape of the liquid crystal lens 33 may be not changed.

Figure 4:
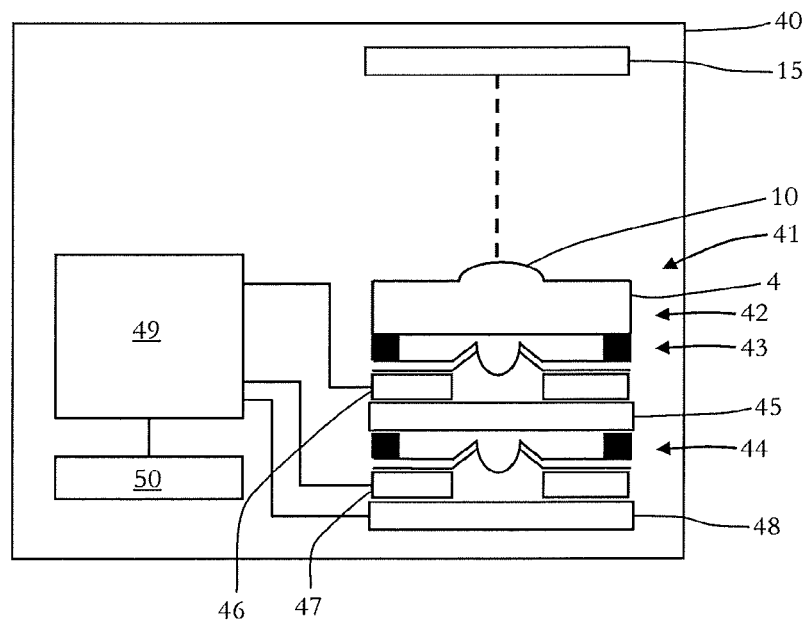
FIG. 4 illustrates a first embodiment of an electronic device.

FIG. 4 illustrates an embodiment of an electronic device 40, e.g. a digital camera, with an optical system 41. The optical system 41 of the electronic device 40 has a wafer level lens stack 42 having two tunable lenses 43 and 44. Each one of the tunable lenses 43 and 44 corresponds to the tunable lens part of the wafer level lens stack 1 of FIG. 1.

The first tunable lens 43 is located on a surface of substrate 4. Substrate 4 corresponds to the substrate 4 of the wafer level lens stack 1 of FIG. 1 and it has lens 10 on its opposite side. The remaining parts above the substrate 4 correspond to the wafer level lens part 2 as discussed for the embodiment of FIG. 1.

A further substrate 45 is located between the first tunable lens 43 and the second tunable lens 44. An electrode 46 of the first tunable lens 43 is located on a first side of the substrate 45, while the second tunable lens 44 is provided on the opposite side of the substrate 45.

The second tunable lens 44 is the last lens before an image sensor 48.

The electronic device 40 has a controller 49 which is connected to a memory 50.

The controller 49 controls the first 43 and second 44 tunable lenses by applying a respective voltage to the electrode 46 of the first tunable lens 43 and the electrode 47 of the second tunable lens 44.

Moreover, the controller 49 is connected to the image sensor 48.

During operation, the controller 49 can receive image date from the image sensor 48 and can determine a blur on the basis of the image data. Then the controller 39 can control, for example, the distance between the tunable lens 44 and the image sensor 48 on the basis of the determined blur, thereby adjusting a back focal length, as explained above.

Moreover, by controlling the first tunable lens 43 and the second tunable 44 accordingly, a zoom functionality can be achieved.

Figure 5:
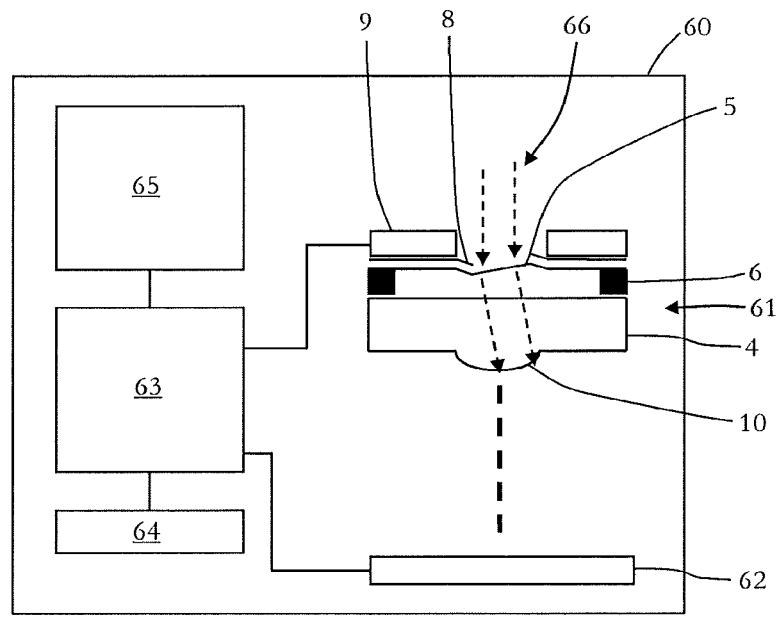
FIG. 5 illustrates a second embodiment of an electronic device.

FIG. 5 illustrates a further electronic device 60, e.g. a smartphone. The electronic device 60 has a wafer level lens stack 61 which basically corresponds to the wafer level lens stack 1 of FIG. 1.

The wafer level lens stack 61 has a substrate 4 with a lens 10 on one side. On the other side of the substrate 4, it has a spacer 6 on which a lens 5 is mounted, on which, in turn, a membrane 8 is located to which electric energy via an electrode 9 can be applied, as has been explained in detail for the tunable lens part 2 of FIG. 1.

The electronic device 60 has an image sensor 62 and a controller 63 which is connected to the image sensor 62. Moreover, a memory 64 and a movement sensor 65 are provided which are both connected to the controller 63.

The controller 63 is also connected to the electrode 9 such that it can control the refraction characteristic of the lens 5, as has been discussed above.

During operation, the controller 63 receives movement data from the movement sensor 65, analyzes this movement data and controls the actuator membrane 8 via the electrode 9 in such a manner that the movement of the electronic device 60 is compensated.

As can also be taken from FIG. 5, the shape of the lens 5 is deformed in such a manner that incoming light rays 66 are deviated in a direction which is opposite to the detected movement.

Thereby, unintended movements of the electronic device 60 can be compensated.

Figure 6:
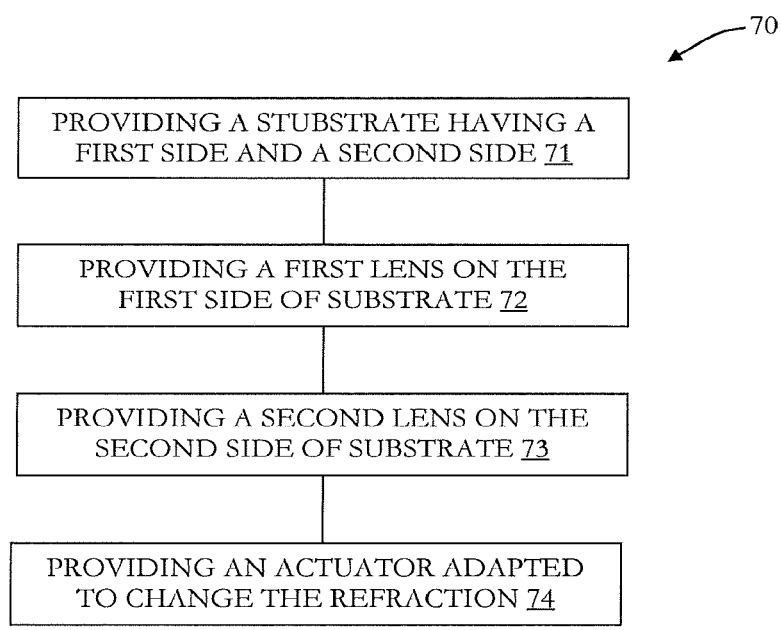
FIG. 6 shows a flowchart of a method of manufacturing a wafer level lens stack.

FIG. 6 illustrates a method 70 of manufacturing a wafer level lens stack, such as the wafer level lens stack 1 of FIG. 1 or any other wafer lens stack described herein. In the following, it is also referred to the embodiment of the wafer level lens 1 of FIG. 1 without limiting the disclosure of the method 70 to this specific embodiment.

At 71 a substrate, e.g. substrate 4, is provided having a first side and a second side.

At 72, a first lens, such as lens 10, is provided on the first side of the substrate. As discussed above, the lens can be produced by providing a polymer on the substrate, forming it via a mold, and curing it by applying ultraviolet light.

At 73, a second lens, such as the lens 5, is provided on the second side of the substrate, wherein the second lens is capable of changing its refraction characteristic.

At 74, an actuator is provided which is adapted to change the refraction characteristic of the second lens.

For example, the second lens, such as the lens 5, can be provided by mounting the spacer ring 6 on the surface of the substrate 4. Then the lens 6 is mounted to the spacer ring 6, the membrane 8 is provided and the electrode 9 is mounted on the top, as it is generally known in the microelectromechanical systems technology.

The skilled person will appreciated that the embodiments described above can be combined in any manner of each other. For example, the movement sensor 65 of the electronic device 60 of FIG. 5 may be integrated in the electronic device 40 of FIG. 4 and the controller 49 of the electronic device 40 may be adapted to compensate a detected movement as it is described for the electronic device 60 of FIG. 5. Moreover, also the electronic device 60 of FIG. 5 may have two tunable lenses, as it is described for the electronic device 40 of FIG. 4, such that the zooming functionality can also be provided in the electronic device 60 of FIG. 5. Of course, the electronic devices 40 and 60 may include anyone of the wafer level lens stacks described herein, e.g. the wafer level lens stack 1 FIG. 1, the wafer level lens stack 20 of FIG. 2, or the wafer level lens stack 30 of FIG. 3. Furthermore, a wafer level lens stack may have several tunable lenses which may be based on different technologies.

All units and entities described in this specification and claimed in the appended claims can, if not stated otherwise, be implemented as integrated circuit logic, for example on a chip, and functionality provided by such units and entities can, if not stated otherwise, be implemented by software.

Note that the present technology can also be configured as described below.

(1) A wafer level lens stack, including:
a substrate having a first side and a second side, the second side being opposite to the first side;
a first lens on the first side of the substrate;
a second lens on the second side of the substrate, wherein the second lens is capable of changing its refraction characteristic; and
an actuator adapted to change the refraction characteristic of the second lens.

(2) The wafer level lens stack of (1), wherein the second lens is deformable and wherein the actuator is adapted to deform the second lens.

(3) The wafer level lens stack of anyone of (1) or (2), wherein the substrate is a glass substrate.

(4) The wafer level lens stack of anyone of (1) to (3), wherein the first lens includes a polymer.

(5) The wafer level lens stack of anyone of (1) to (4), wherein the actuator is based on the microelectromechanical systems technology.

(6) The wafer level lens stack of (5), further including an optical membrane attached to the second lens, wherein the actuator is adapted to deform the shape of the optical membrane of the second lens.

(7) The wafer level lens stack of anyone of (1) to (6), wherein the second lens is a liquid lens.

(8) The waver level lens stack of (7), wherein the actuator is adapted to deform the liquid lens.

(9) The wafer level lens stack of anyone of (1) to (8), wherein the second lens a liquid crystal lens.

(10) The waver level lens stack of (9), wherein the actuator is adapted to deform the liquid crystal lens.

(11) The wafer level lens stack of anyone of (1) to (10), further including a third lens being capable of changing its refraction characteristic and further including a second actuator adapted to change the refraction characteristic of the third lens.

(12) An optical system, including:
a wafer level lens stack, in particular according to anyone of (1) to (11), including:
a substrate having a first side and a second side, the second side being opposite to the first side;
a first lens on the first side of the substrate;
a second lens on the second side of the substrate, wherein the second lens is capable of changing its refraction characteristic; and
an actuator adapted to change the refraction characteristic of the second lens, and
an image sensor.

(13) The optical system of (12), further including a controller configured to control the actuator, wherein the image sensor includes an image surface, wherein the second lens is located adjacent to the image surface of the image sensor, and wherein the controller is adapted to control a distance between the second lens and the image surface of the image sensor.

(14) The optical system of (12) or (13), further including a controller configured to control the actuator, and a movement detector configured to detect a movement of the optical system, wherein the controller is adapted to compensate a detected movement of the optical system by controlling the actuator such that the refraction characteristic of the second lens is such changed that the detected movement is compensated.

(15) An electronic device, including:
a wafer level lens stack, in particular according to anyone of (1) to (14), including:
  a substrate having a first side and a second side, the second side being opposite to the first side;
  a first lens on the first side of the substrate;
  a second lens on the second side of the substrate, wherein the second lens is capable of changing its refraction characteristic; and
  an actuator adapted to change the refraction characteristic of the second lens, an image sensor, and
  a controller configured to control the actuator and the image sensor.

(16) The electronic device of (15), wherein the image sensor includes an image surface and wherein the second lens is located adjacent to the image surface of the image sensor.

(17) The electronic device of (16), wherein the controller is adapted to control a distance between the second lens and the image surface of the image sensor by controlling the actuator.

(18) The electronic device according to anyone of (15) to (17), further including a movement detector configured to detect a movement of the electronic device.

(19) The electronic device of (18), wherein the controller is adapted to compensate a detected movement of the electronic device by controlling the actuator such that the refraction characteristic of the second lens is such changed that the detected movement is compensated.

(20) Method of manufacturing a wafer level lens stack, in particular according to anyone of (1) to (11), including:
providing a substrate having a first side and a second side;
providing a first lens on the first side of the substrate;
providing a second lens on the second side of the substrate, wherein the second lens is capable of changing its refraction characteristic; and
providing an actuator adapted to change the refraction characteristic of the second lens.

The invention claimed is:

1. A wafer level lens stack, comprising:
a substrate having a first side and a second side, the second side being opposite to the first side;
a first lens on the first side of the substrate, the first lens having fixed refraction characteristic;
a second lens on the second side of the substrate, wherein the second lens has tunable refraction characteristic; and
an actuator adapted to change the tunable refraction characteristic of the second lens, the actuator including an electrode layer between a curved portion of the first lens and the second lens.

2. The wafer level lens stack of claim 1, wherein the second lens is deformable and the actuator is adapted to deform the second lens.

3. The wafer level lens stack of claim 1, wherein the substrate is a glass substrate.

4. The wafer level lens stack of claim 1, wherein the first lens comprises a polymer.

5. The wafer level lens stack of claim 1, wherein the actuator is based on the microelectromechanical systems technology.

6. The wafer level lens stack of claim 5, further comprising
an optical membrane attached to the second lens,
wherein the actuator is adapted to deform the shape of the optical membrane attached to the second lens.

7. The wafer level lens stack of claim 1, wherein the second lens is a liquid lens.

8. The wafer level lens stack of claim 7, wherein the actuator is adapted to deform the liquid lens.

9. The wafer level lens stack of claim 1, wherein the second lens a liquid crystal lens.

10. The wafer level lens stack of claim 9, wherein the actuator is adapted to deform the liquid crystal lens.

11. The wafer level lens stack of claim 1, further comprising
a third lens having tunable refraction characteristic and
a second actuator adapted to change the tunable refraction characteristic of the third lens.

12. An optical system, comprising:
a wafer level lens stack, including:
  a substrate having a first side and a second side, the second side being opposite to the first side;
  a first lens on the first side of the substrate, the first lens having fixed refraction characteristic;
  a second lens on the second side of the substrate, wherein the second lens has tunable refraction characteristic; and
  an actuator adapted to change the tunable refraction characteristic of the second lens, and an image sensor, the actuator including an electrode layer between a curved portion of the first lens and the second lens.

13. The optical system of claim 12, further comprising
a controller configured to control the actuator,
wherein the image sensor includes an image surface,
wherein the second lens is located adjacent to the image surface of the image sensor, and
wherein the controller is adapted to control a distance between the second lens and the image surface of the image sensor.

14. The optical system of claim 12, further comprising
a controller configured to control the actuator, and
a detector configured to detect a movement of the optical system,
wherein the controller is adapted to compensate a detected movement of the optical system by controlling the actuator such that the tunable refraction characteristic of the second lens is such changed that the detected movement is compensated.

15. An electronic device, comprising:
a wafer level lens stack, including:
  a substrate having a first side and a second side, the second side being opposite to the first side;
  a first lens on the first side of the substrate, the first lens having fixed refraction characteristic;
  a second lens on the second side of the substrate, wherein the second lens has tunable refraction characteristic; and
  an actuator adapted to change the tunable refraction characteristic of the second lens, an image sensor, the actuator including an electrode layer between a curved portion of the first lens and the second lens, and a controller configured to control the actuator and the image sensor.

16. The electronic device of claim 15, wherein the image sensor includes an image surface and the second lens is located adjacent to the image surface of the image sensor.

17. The electronic device of claim 16, wherein the controller is adapted to control a distance between the second lens and the image surface of the image sensor by controlling the actuator.

18. The electronic device of claim 15, further comprising a movement detector configured to detect a movement of the electronic device.

19. The electronic device of claim 18, wherein the controller is adapted to compensate a detected movement of the electronic device by controlling the actuator such that the tunable refraction characteristic of the second lens is such changed that the detected movement is compensated.

20. Method of manufacturing a wafer level lens stack, comprising:

providing a substrate having a first side and a second side;

providing a first lens on the first side of the substrate, the first lens having fixed refraction characteristic;

providing a second lens on the second side of the substrate, wherein the second lens has tunable refraction characteristic; and providing an actuator adapted to change the tunable refraction characteristic of the second lens, including providing an electrode layer between a curved portion of the first lens and the second lens.

* * * * *